(12) United States Patent
Chan

(10) Patent No.: US 6,996,387 B2
(45) Date of Patent: Feb. 7, 2006

(54) GLOBAL DATA NETWORK USING EXISTING WIRELESS INFRASTRUCTURES

(75) Inventor: Chung Chan, Waban, MA (US)

(73) Assignee: MTEL Limited, WanChai (HK)

( * ) Notice: Subject to any disclaimer, the term of this patent is extended or adjusted under 35 U.S.C. 154(b) by 1001 days.

(21) Appl. No.: 09/847,618

(22) Filed: May 2, 2001

(65) Prior Publication Data

US 2002/0010758 A1 Jan. 24, 2002

Related U.S. Application Data

(63) Continuation-in-part of application No. 09/564,352, filed on May 1, 2000, now Pat. No. 6,760,759, and a continuation-in-part of application No. 09/694,643, filed on Oct. 23, 2000.
(60) Provisional application No. 60/235,515, filed on Sep. 26, 2000, provisional application No. 60/238,753, filed on Oct. 6, 2000, and provisional application No. 60/279,311, filed on Mar. 28, 2001.

(51) Int. Cl.
*H04H 1/00* (2006.01)
*G06F 15/16* (2006.01)

(52) U.S. Cl. ........................... 455/301; 709/219
(58) Field of Classification Search ............... 455/3.01; 709/219; 711/118, 113
See application file for complete search history.

(56) References Cited

U.S. PATENT DOCUMENTS

| | | | |
|---|---|---|---|
| 5,953,723 A | 9/1999 | Linoff et al. | 707/102 |
| 5,978,833 A | 11/1999 | Pashley et al. | 709/200 |
| 5,991,306 A * | 11/1999 | Burns et al. | 370/429 |
| 6,020,916 A | 2/2000 | Gerszberg et al. | 384/15 |
| 6,167,438 A * | 12/2000 | Yates et al. | 709/216 |
| 6,229,823 B1 | 5/2001 | Scarmalis | 370/477 |
| 6,438,575 B1 * | 8/2002 | Khan et al. | 709/200 |
| 6,707,581 B1 * | 3/2004 | Browning | 358/473 |

FOREIGN PATENT DOCUMENTS

| | | |
|---|---|---|
| CN | 1263616 | 2/1999 |
| EP | 0 875 878 | 11/1998 |
| EP | 0 917 330 A2 | 5/1999 |
| EP | 0 966 138 | 12/1999 |
| EP | 0 982 672 | 3/2000 |
| EP | 0 986 209 A2 | 3/2000 |
| EP | 1 045 562 A2 | 10/2000 |
| GB | 2 327 565 A | 1/1999 |
| JP | 11219312 | 10/1999 |
| JP | 2000-78654 | 3/2000 |
| WO | WO97/14244 | 4/1997 |
| WO | WO 97/33421 | 9/1997 |
| WO | WO 98/09452 | 3/1998 |
| WO | WO 99/33293 | 7/1999 |
| WO | WO 00/21269 | 4/2000 |
| WO | WO 00/22794 | 4/2000 |
| WO | WO00/19323 | 6/2000 |
| WO | WO 00/76134 A1 | 12/2000 |

* cited by examiner

Primary Examiner—Krisna Lim
(74) Attorney, Agent, or Firm—Weingarten, Schurgin, Gagnebin & Lebovici LLP

(57) ABSTRACT

A system of data servers, organizing software and applications enable mobile users communicating through advanced wireless handheld devices to access a wide array of information on the Internet and in databases. The system incorporates acceleration and compression techniques, selective caching, and data-mining technology to deliver a variety of data types to the handheld at speeds many times faster (up to 20x) than it would have without the present system. Security measures are implemented at the handhelds and servers, as well as at partner sites to facilitate secure E-Commerce transactions. Direct connections to wireless networks allow a significant portion of the communications to by-pass slower wireless modems. The use of high-speed paths through the Internet allow wireless data communications across incompatible wireless standards. A central database expeditiously and in a format targeted to the handheld.

4 Claims, 14 Drawing Sheets

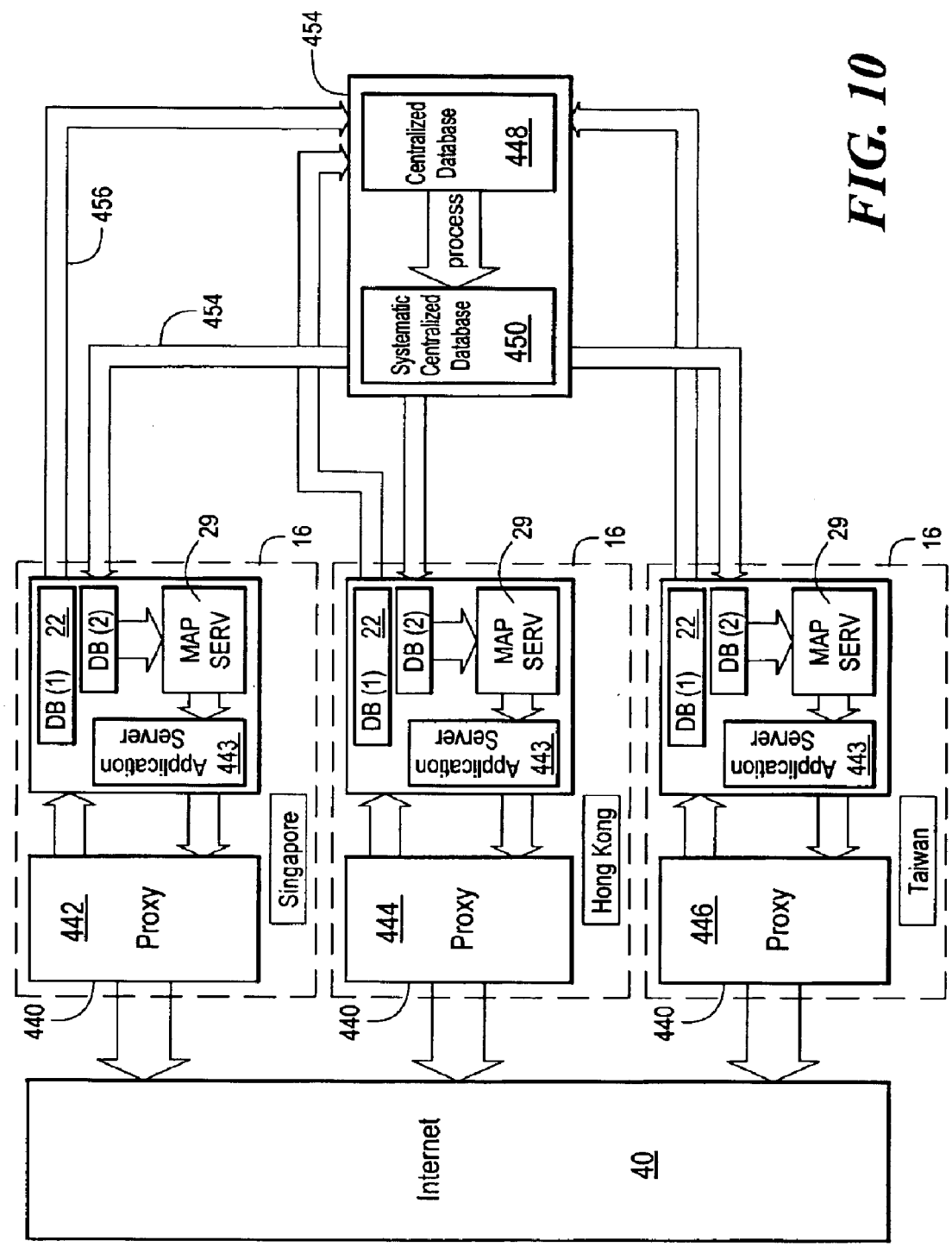

GLOBAL DATA NETWORK USING EXISTING WIRELESS INFRASTRUCTURES

CROSS REFERENCE TO RELATED APPLICATIONS

This application is a continuation-in-part of U.S. patent application Ser. No. 09/564,352, filed May 1, 2000, now U.S. Pat. No. 6,760,259, issued Jul. 6, 2004, and U.S. patent application Ser. No. 09/694,643, filed Oct. 23, 2000, incorporated herein by reference and claims priority from Provisional Applications 60/235,515 filed Sep. 26, 2000, 60/238,753 filed Oct. 6, 2000 and 60/279,311 filed Mar. 28, 2001.

STATEMENT REGARDING FEDERALLY SPONSORED RESEARCH OR DEVELOPMENT

N/A

BACKGROUND OF THE INVENTION

The existing wireless mobile phone infrastructures are implemented in a number of standards including: the Global System for Mobile Communication (GSM) including its implementation of the General Packet Radio Service (GPRS) or Code Division Multiplexing Algorithm (CDMA). This infrastructure supports international voice calling within one standard area but does not support mobile phone data transfer. In addition, the existence of multiple standards presents difficulties when a customer using a one standard tries to call a country utilizing another standard. For instance, the majority of the United States utilizes CDMA and Time Division Multiplexing Algorithm (TDMA), while much of Asia and Europe use GSM and GPRS. Therefore, while a US based mobile user can call a land-based phone worldwide, that user cannot access a mobile user in Europe.

The difficulties are compounded when trying to send data rather than voice globally utilizing mobile technology. In those places where a mobile network for data does exist, it has limited speed and span and is not designed for international compatibility. In the CDMA realm, the maximum speed is approximately 64 Kb/sec with reliable data transmission usually utilizing 19.8 Kb/sec. In the GSM realm, 9.6 Kb/sec is the general transmission speed while in the realm of GPRS, general data communication is theoretically possible at 115 Kb/s but in reality is limited to approximately 30 Kb/s, although there are limited areas where higher bandwidths are available. These speeds must be contrasted with the current land data rates of a T1 line of approximately 1.5 Mbits/sec.

The best prospect for increasing this speed is the implementation of the General Packet Radio Service (GPRS) protocols and the $3^{rd}$ generation (3G) infrastructures worldwide. This implementation is delayed waiting for wider implementation of the GSM network and higher speed transmission rates utilizing GPRS over GSM. In addition, implementation of GPRS is delayed by the requirement that the GSM operations cannot be inhibited during GPRS implementation. Currently, the performance of GPRS over GSM is comparable to GSM with conventional data mechanisms because GPRS and GSM share a bandwidth. Even if GPRS did not have performance bottlenecks, the availability of GPRS handsets is limited. Because the majority of users will only start to use data transmission over a mobile network for Emails, they are unlikely to purchase the expensive handsets needed for GPRS. Until performance improves, the added cost of GPRS will not be justified.

Even if GPRS over GSM met performance objectives, the compatibility problems among the GSM, GSM/GPRS and CDMA regions of the world would persist. Handsets designed for one standard are currently not compatible the other standards. Even within the GSM realm, a GPRS compatible handset is limited to that area of GSM coverage that implements GPRS.

One means to supply global communications capability that includes data transmission was built using satellite-based technologies. This system was unsuccessful due to the cost of the satellite network and the cost of the handsets. Therefore, there is a global need for an economical means to transfer data across geographically significant distances from a mobile phone.

BRIEF SUMMARY OF THE INVENTION

Taking notice of the extensive telecommunications and Internet networks implemented, the Global Data network (GloDAN) is designed to take advantage of these networks to provide a virtual worldwide wireless data network. This virtual network allows users in an area of the world using one wireless communications standard to seamlessly access data being provided on a different communications standard (wireless or land-based) in another part of the world.

In conjunction with providing this virtual network, GloDAN implements support mechanisms to overcome the data handling limitations of current wireless networks. Analyses of past transaction sequences predict users' behaviors and update local resources so that the data expected to be requested is available locally. By this means, the apparent response time of the system is significantly improved. Compression techniques, parallel verification, and directed use of the known high-bandwidth paths in the Internet are used to provide an adequate response rate for users' needs. Modular design of the system enables the utilization of improvements in the wireless systems as they are implemented in the future.

This system provides a complete technical solution to implementing mobile data applications on existing GSM, TDMA, Cellular Digital Packet Data (CDPD), CDMA and GPRS infrastructures. The solution functions using the current bandwidth available for data transfer on the wireless infrastructures and will utilize higher bandwidths, as they become available. By improving existing wireless facilities only when needed, a global mobile data network is formed at minimal cost.

Other aspects, features, and advantages of the present invention are disclosed in the detailed description that follows.

BRIEF DESCRIPTION OF THE SEVERAL VIEWS OF THE DRAWING

The invention will be understood from the following detailed description in conjunction with the drawings, of which:

FIG. 10 is a block diagram of the central database according to the invention.

DETAILED DESCRIPTION OF THE INVENTION

A gateway and total solution system (GTSS), as disclosed in co-pending application Ser. Nos. 09/564,352 and 09/694,643 filed 5/01/2000 and 10/23/2000 respectively, herein incorporated by reference, provides data access services to a mobile user. This invention extends the GTSS to facilitate global data communications. The description of the extensions is based on the summary of the GTSS below.

Figure 1:
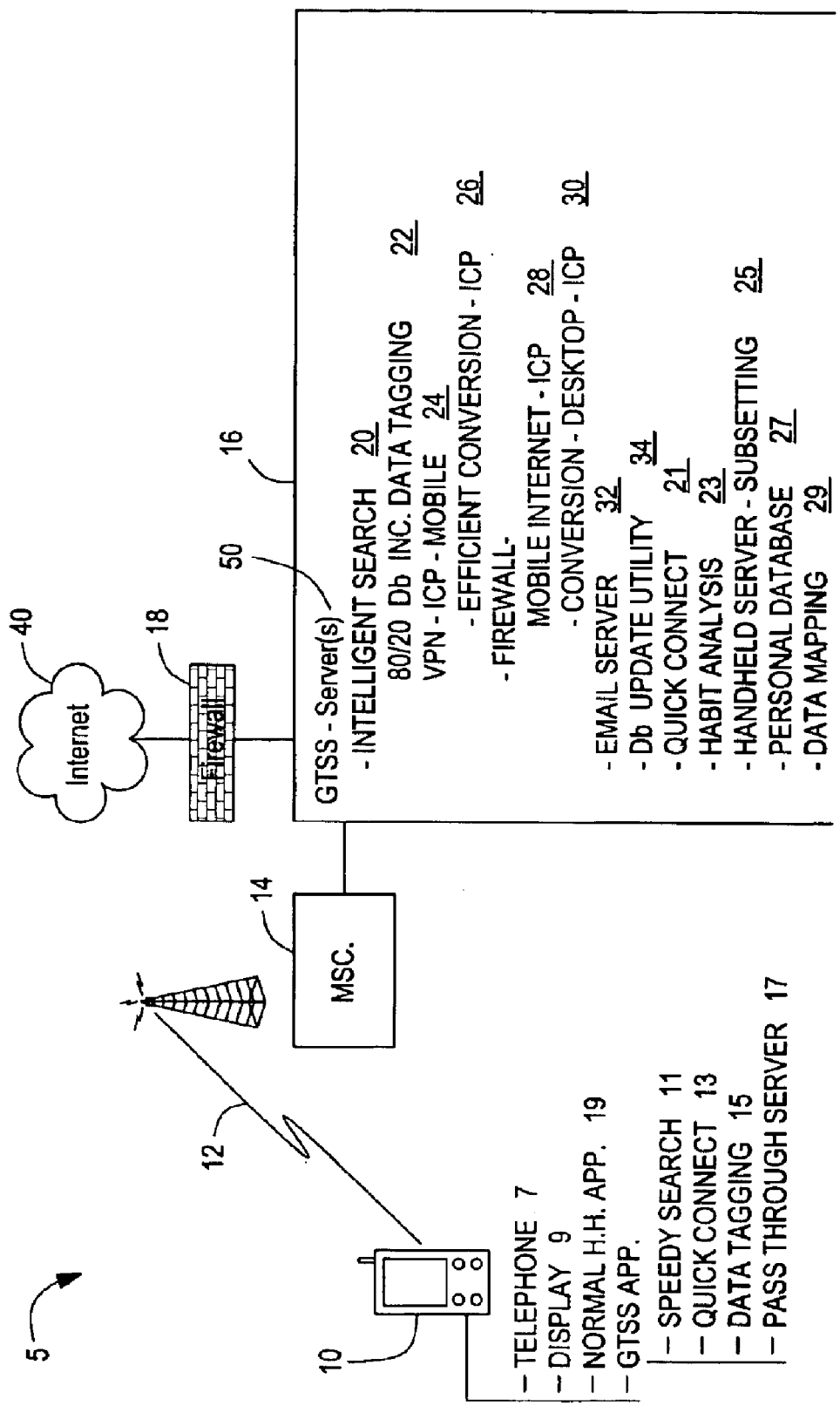
FIG. 1 is a functional block diagram of a GTSS system according to a prior disclosure.

FIG. 1 is a block diagram of the GTSS 5 as previously described, showing support for Internet access and digital transmission for extended handheld units 10 using one of the GSM, GPRS, CDMA or Bluetooth wireless communications standards. The GTSS components are the extended handheld unit 10 providing the functions of a mobile telephone and a portable PC or PDA, with special software and a GTSS server 16 providing services to the handheld 10 and providing access to the Internet 40 and the services delivered through it. The handheld 10 connects through the wireless network 12 and the Mobile Switching Center (MSC) 14 to the GTSS server 16.

The GTSS 5 provides services targeted for two results, improving the communication speed to the handheld 10 and providing content tailored for the handheld's visual capabilities. GTSS server 16 is replicated and distributed within a territory proximate to the users. The servers 16 are interconnected for specific benefits discussed below and hold the content that the user desires as physically close to the user as possible. The speed provided by support services compensates for the cost structure and low bandwidth of wireless communication and the limitations of the screen of handheld unit 10. Speed services are located both in the handheld unit 10 and the GTSS server 16. Special content is needed to present a wide variety of information in formats adapted to the handheld screen while utilizing the speed services to increase user satisfaction.

The handheld 10 is loaded with traditional PDA applications 19 such as address book, memo, and to-do list that use the display 9 and the telephone 7 and a set of GTSS applications. One previously disclosed handheld-resident GTSS application, speedy search 11, facilitates the creation of search requests that retrieve precisely the information wanted from the Internet 40 or databases (not shown) without requiring a series of time consuming dialogs traversing the wireless network. Speedy search 11 augments the wide ranging search facilities already available for the Internet 40 by guiding the user to precisely define what is wanted before the search is conducted. With the speedy search, the number of hits that require a dialog between the handheld 10 and server 16 is limited. Because multiple search interactions are not required, the user receives the information desired more quickly.

A second previously disclosed handheld resident GTSS application is a quick-connect service 13; a service that identifies the user and authorization as the handheld unit 10 is connecting to the server 16. The server component 21 of the quick-connect service not only establishes the connection with minimal interactions but also quantifies each transmission to the handheld to fill an entire screen. The server quick-connect facility 21 also maintains a running status of each active connection to enable a communications ride-through in case of a wireless service outage. On reconnect of a lost connection, the server 16 transparently reestablishes the link and resumes the interrupted transaction from the last completed dialog.

To further speed interactions between the handheld 10 and the server 16, data tagging 15 is implemented. This is a mechanism where the dynamic portions of the data are tagged with a time-stamp. When using data tagging 15, the handheld unit 10 reports the timeliness of data already resident in the handheld 10 and only requires downloads of updates. This feature includes server support for data field tagging 22 with the resultant shortened transmission times that provide the user with improved usability. This feature is used in conjunction with applications that dynamically display information, such as the changes of stock prices in real time. The current stock price applications displayed via desktop web browsing refresh the entire price form, rather than just the prices. Data tagging makes this is unnecessary and speeds the real time update of just the price quote.

Some handheld units will utilize a previously disclosed application that allows the handheld to act as a pass-through server 17 for a number of other handhelds. This pass-through application 17 takes advantage of the Bluetooth short distance transmission technology. It re-transmits the data the handheld 10 received from the GTSS server 16 over the wireless connection to other handhelds 10 within approximately ten meters of the pass-through handheld server. The pass-through application 17 will also collect and consolidate inputs from the other handhelds 10 to provide an interactive experience for all the handheld users.

Speed also implies that the server 16, the main data portal for the handheld unit 10, has specialized capabilities. One of these capabilities is a database 22 of information formatted as screens tailored for the handheld unit. This database may be entirely resident on the local server 16 or may be distributed over a number of databases accessed by communications including the Internet 40. For information that has not been formatted for a handheld 10, a GTSS formatter application converts the desktop-formatted pages to handheld screen format. This conversion may be a straight transform of one desktop page to a number of handheld screens, a conversion according to some optimized conversion schemes or a tailored conversion, approved by the information content provider (ICP), that optimizes the desktop presentation for the handheld environment.

A major improvement in apparent speed comes about because the server 16 is able to directly access an extensive database 22 of information that has been prestored based on the user's prior usage and projected needs. Such a database, termed an 80/20 RIDb 22 avoids the need to wait for a full Internet transaction to send data to the handheld unit 10. The 80/20 RIDb 22 includes full motion video formatted for the handheld screen in addition to text and graphics information.

An update utility 34 keeps the 80/20 RIDb 22 current in real time by monitoring the page-based data and updating the corresponding screen-formatted data whenever the page-based data changes.

The server 16 that is the primary contact for a particular user is a member of a set of GTSS servers 16 tailored for mobile users. High speed interconnects between these servers 16 allow the specially formatted information in one to be available to all. An intelligent search engine 20 distinguishes between searches that need to use the Internet 40 and searches that are centered on the set of GTSS servers 16 to improve the speed of service to the users. In addition, as the users' access habits change, the utility repositions data so that frequently accessed data is in the high-speed databases. The intelligent search engine 20 is updated with the current location of all data. All secure transactions among the GTSS servers 16 use protocols implementing security provisions to create virtual private networks (VPNs) 24 assuring the data is not corrupted.

The features that support special content for the handheld mobile user include a personal database application 27 that stores the user's files in the GTSS databases. This application 27 allows the user to access their information without regard to the type of connection being used.

An ICP update application 28, which allows content providers to submit updates to stored desktop web pages and have that update be formatted both for the desktop and for the handheld screen, further supports the speed of delivery of the special contents. Even though the updates were created over a VPN, the updates are authenticated before being entered into the master database.

For those information providers who choose not to provide handheld screens on the Internet, but who provide pre-approval, fast custom conversion applications 26 are supplied to improve the speed of screen information access. Grouping information based on the user's access and holding that information in the most accessible storage media is an implemented capability. A conversion application 30 converts a general desktop web page to a handheld format. Its use is conditioned on the handheld user's explicit request for the conversion. A database update application 34 applies artificial intelligence techniques to the update of information. It continues to monitor the database to improve access after a user initially subscribes to information.

For reliability and capacity, the functions of the GTSS server 16 are implemented in a number of designated servers. A proxy server fields the user communications, directs the requests to the appropriate server within GTSS, and sends data back to the handheld units. It makes the entire GTSS system look like one entity to handhelds connected to the GTSS.

The proxy server uses a mapping application 29 to retrieve data. The mapping application 29 maintains a database of the data available, determines which location can provide the fastest-response data and retrieves the data from there. The database with the fastest-response is the 80/20 RIDb 22 located in the local site. In descending order of responsiveness, the mapping application 29 accesses data from 80/20 RIDb, other databases connected by dedicated lines to this site (not shown), Information content providers 24(ICP) on Virtual Private Internets (VPN) or Intranets, ICPs that need converting 30 on a VPN, ICPs providing handheld formatted data external to the GTSS 16 and ICPs providing desktop data on the Internet 40.

Figure 2:
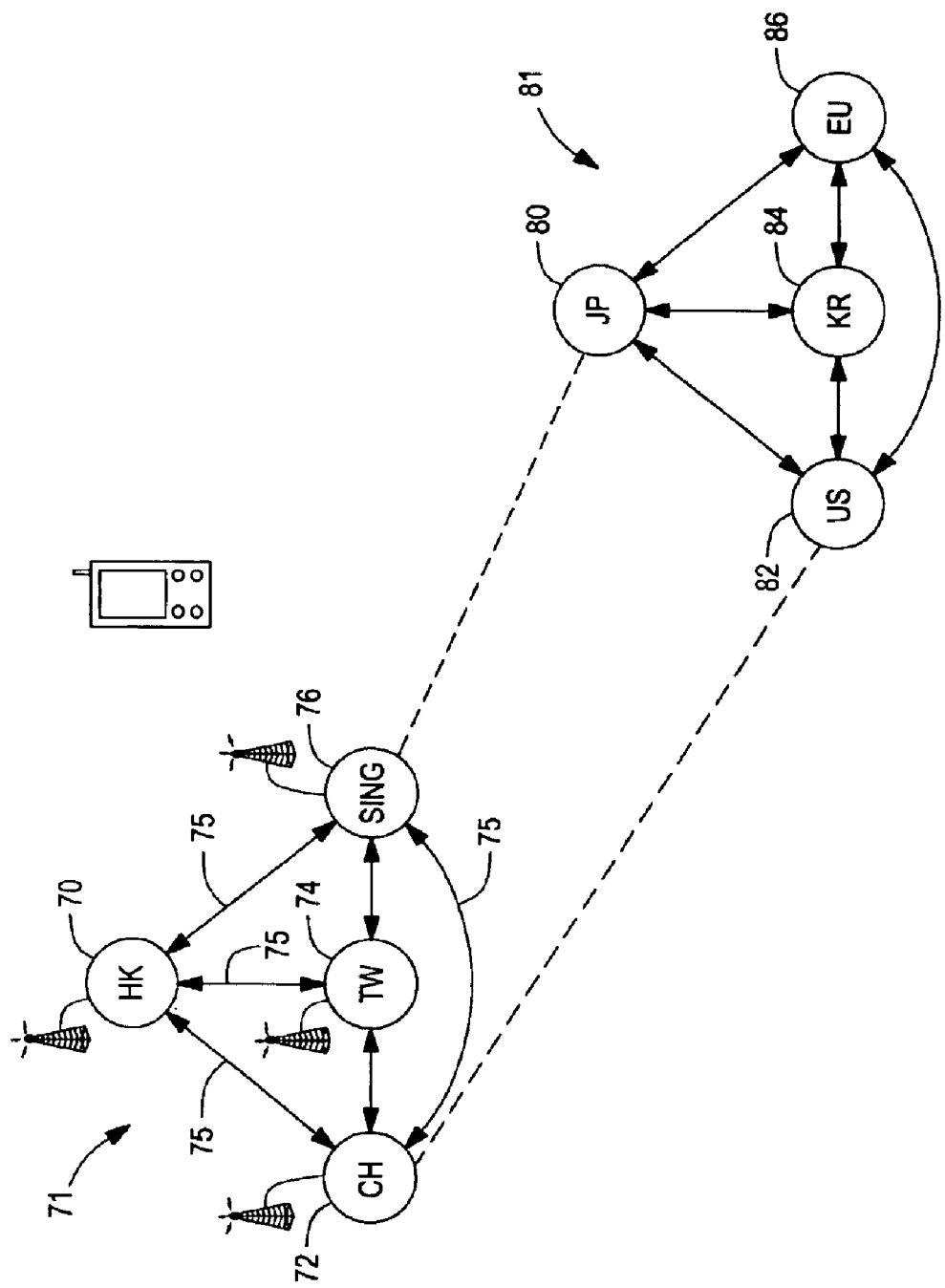
FIG. 2 illustrates the interconnection of GTSS systems into territories according to a prior disclosure.

FIG. 2 illustrates territorial connection of GTSS servers 5 previously disclosed where the regional servers within a territory are tied to other servers within the territory. For instance, in the Chinese Territory 71 shown, the regional servers for Hong Kong 70, China 72, Taiwan 74 and Singapore 76 are connected by high speed intelligent links 75 using landlines, optical links or high speed wireless links. These links enable the regional servers 70,72,74 and 76 to share data in a transparent manner limiting duplication among the regions. In the previously disclosed implementations, these links are not usually part of the Internet 40, but form a Virtual Private Net (VPN) with no additional need for security. Some regional servers maintain connections to other territories 81, but the transmissions speeds possible usually limit the response time of these connections. Therefore, the databases stored at the distant servers are not as readily shared as those within the territory.

Figure 3A:
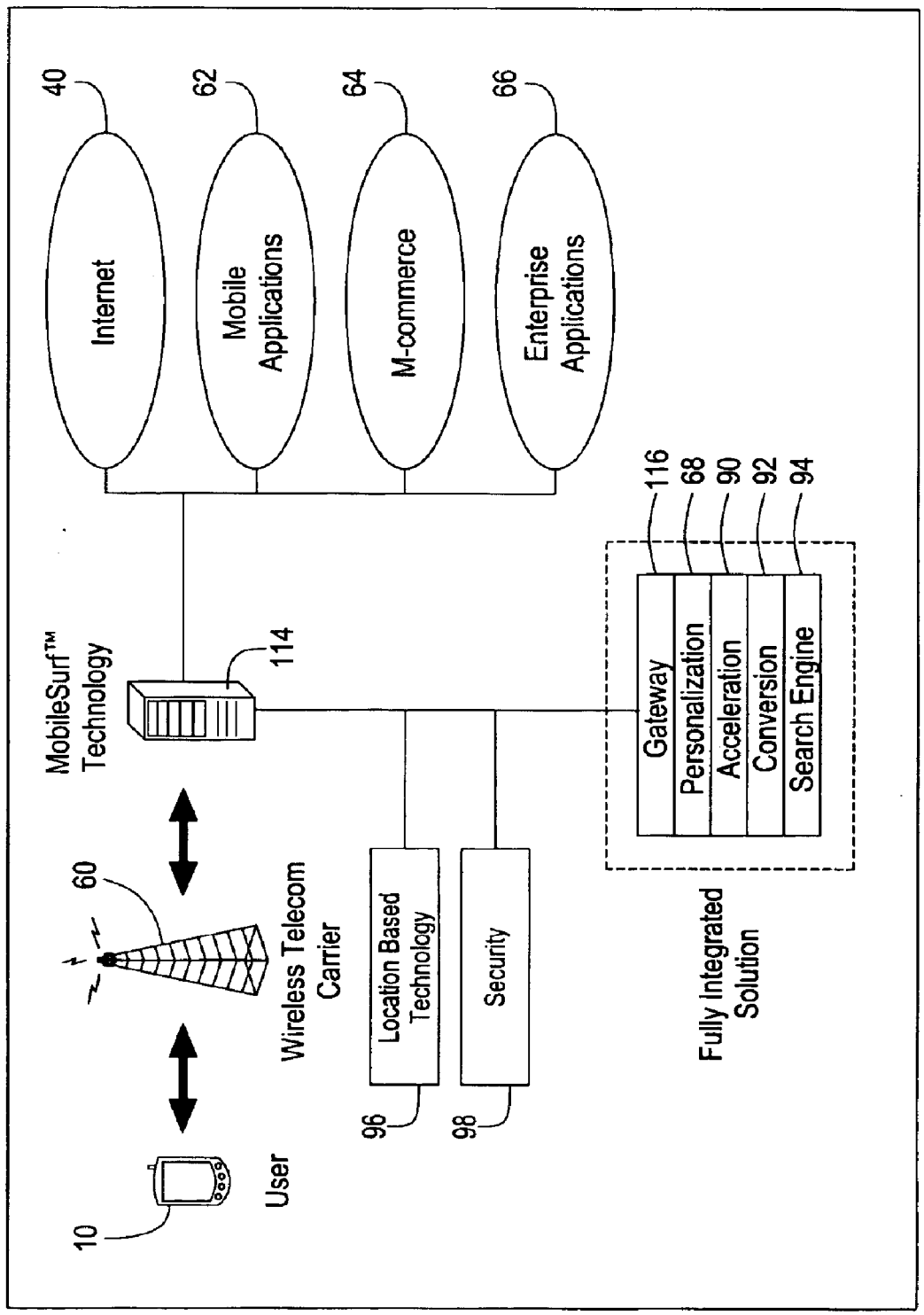
FIG. 3a is a block diagram of a site in the GloDAN system according to the invention.

The Global Data Access Network (GloDAN) herein described extends the capabilities of the GTSS described above by extending the capabilities of the GTSS sites (EGTSS), providing more applications for the handheld unit, and adding a central database base that facilitates interconnecting the individual EGTSS sites as equals. FIG. 3a illustrates this Extended total fully integrated solution. The user 10 connects to the wireless telecommunications carrier 60 via industry standard protocols. The EGTSS 114 connects to the wireless network through the Message Switching Center (MSC not shown). The EGTSS connects to the Internet 40 and stores known industry applications such as mobile applications 62, mobile-commerce applications 64 and specific enterprise applications 66 for downloading to handhelds 10. The EGTSS 114 also contains an integrated solution to service the mobile users composed of a gateway application 116, personalization services 68, acceleration server 90, conversion applications 92 and search engine 94, each more fully described below. Location-based technology 96 and security features 98, described below, may be implemented for specific handheld users and is integrated when used.

Each extension incorporated in GloDAN increases the utility of the system. The combined effect of these extensions makes new uses of the wireless net possible. Some of the extensions are designed and implemented as a set of capabilities while others extend the system in their own right. Table 1 lists the added features that constitute GloDAN. The table is broken into three parts listing the new features for the EGTSS sites in Table 1a, the new features for the handhelds in Table 1b and the new features for the central database in Table 1c. Each new featured is explained below.

TABLE 1a

EGTSS features of GloDAN

| GloDAN component | Added Feature |
| --- | --- |
| EGTSS | Gateway acts as an access server, providing universal connectivity across wireless communication standards |
| | Integrating Geographic Information Service and user location services to providing location-dependent content |
| | WebCam and Display services. |
| | Acceleration and Compression Techniques |
| | Document Caching |
| | Self-creating Databases |
| | Data-mining to find correlation's for predictive services and Predictive updates to Personal Database |

TABLE 1a-continued

EGTSS features of GloDAN

| GloDAN component | Added Feature |
|---|---|
| | Implement Full Security features including SSL/HTTP protogroups and process security features in parallel with content access to accelerate content retrieval<br>Ecommerce<br>Acceleration Server<br>Personalization |

TABLE 1b

Handheld Features of GloDAN

| GloDAN component | Added Feature |
|---|---|
| Handheld | associating an Internet Address with Each handheld<br>Interpret compressed transmissions<br>Full use of security provisions<br>Ecommerce from Handheld<br>Full use of Personal PC applications |

TABLE 1c

Database Features of GloDAN

| GloDAN component | Added Feature |
|---|---|
| Database | Central Database tracker so any location can find the optimal available source of needed content<br>Use knowledge of Internet to direct information on a known path rather than have variable delay time through the Internet<br>Caching frequently requested data in multiple databases for speed - incorporating coordination of data (Dynamic Database Support) |

Figure 3B:
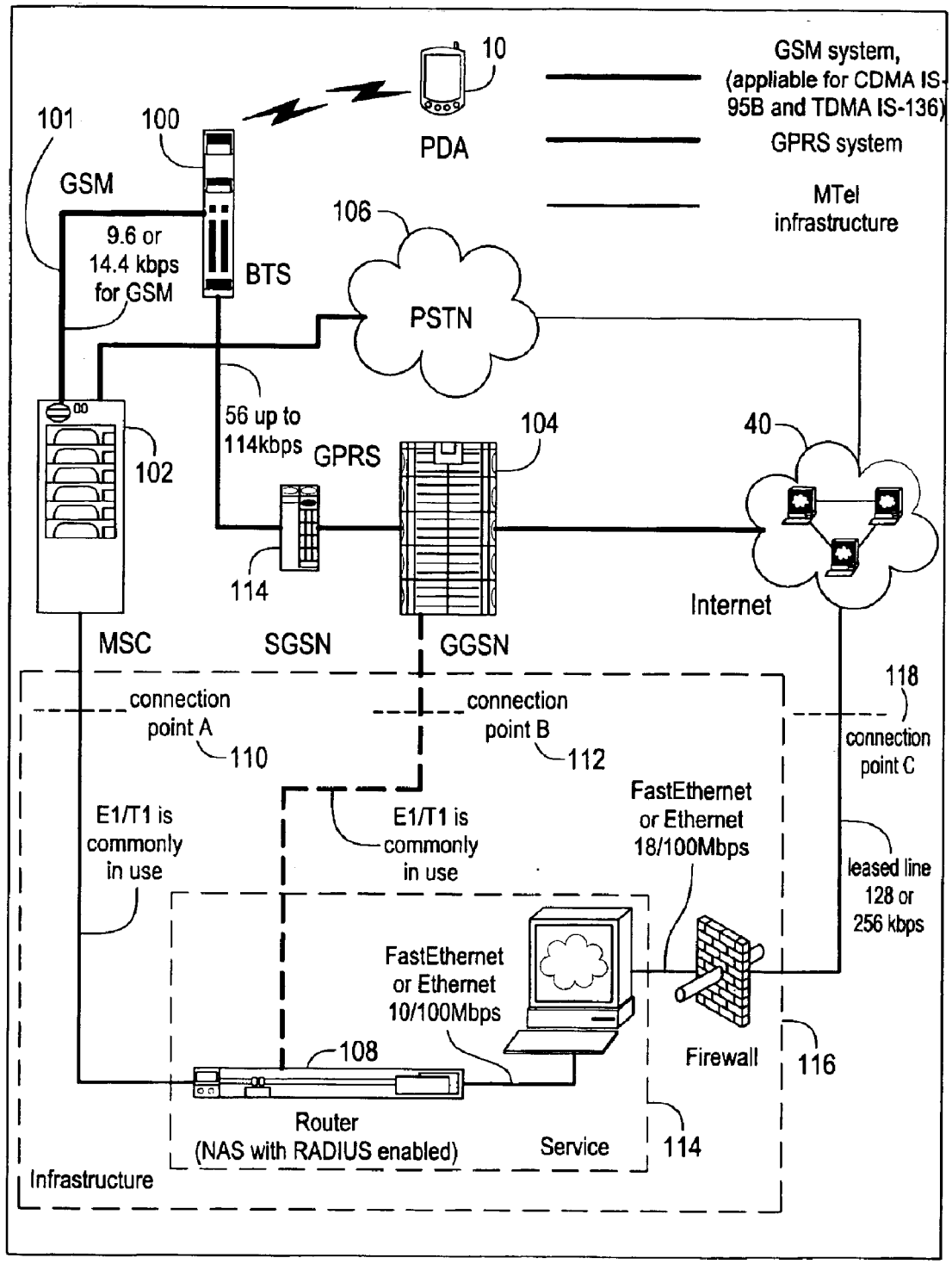
FIG. 3b is a block diagram of the EGTSS simultaneously connecting to both a GSM and a GPRS wireless network according to the invention.

Gateway Acts as an Access Server, Providing Universal Connectivity Across Wireless Communication Standards FIG. 3b illustrates the extended gateway access server 116, the part of the EGTSS 16 that that has been designed to sit in close proximity to the wireless carrier's switch. The gateway access server 116 provides an efficient content delivery interface between the handheld unit 10 and the databases. The gateway 116 allows applications at the handheld to access the EGTSS data through whatever communications standard is available locally. In FIG. 3, the gateway access server 116 is shown connected to communications facilities via three ports. Port 110 connects to the Mobile Switching Center (MSC) 102 of the GSM network 101 and to the public telephone network 106. Port 112 connects to the gateway GPRS support node (GGSN 104) that provides access to the base switching center (BST 100) through the service GPRS node 114 and the GPRS network. Ports 110 and 112 can be implemented using either a E1 or T1 communications link which utilize speeds up to 1.048 Mbps per line. This significantly speeds up communication with the handheld 10 relative to the modem connections by eliminating the need for modem to modem communications. For example, a modem to modem dial up process typically takes 30–40 sec while direct connection to the digital gateway requires only a few sec. By utilizing the higher bandwidth available more efficiently, the GloDAN system is able to prevent loss or corruption of data by allocating some portion of the higher bandwidth to security applications. Notice that the access server 116 is located at an intermediate point between the Internet 40 and mobile network. Therefore it can provide the infrastructure to allow handheld units 10 to operate on one wireless standard and connect to EGTSS servers on other wireless standards.

By providing a completely integrated wireless data platform, that allows PDA users to access Internet content and application using existing infrastructure networks, such as GSM, GPRS, CDMA, and TDMA, EGTSS provides maximum span of access.

A total integrated system also allows handheld systems to function properly because the GloDAN system monitors the pages being downloaded from the Internet and does not allow formats that are not supported by the particular handheld being used. Rather it reformats the pages to a screen-based format supported by the handheld. If unsupported formats are sent to the handheld, often times the handheld will get stuck or hang-up. Other times, the handheld will just wait for the appropriate format to be download and not continue with the operations.

Figure 4:
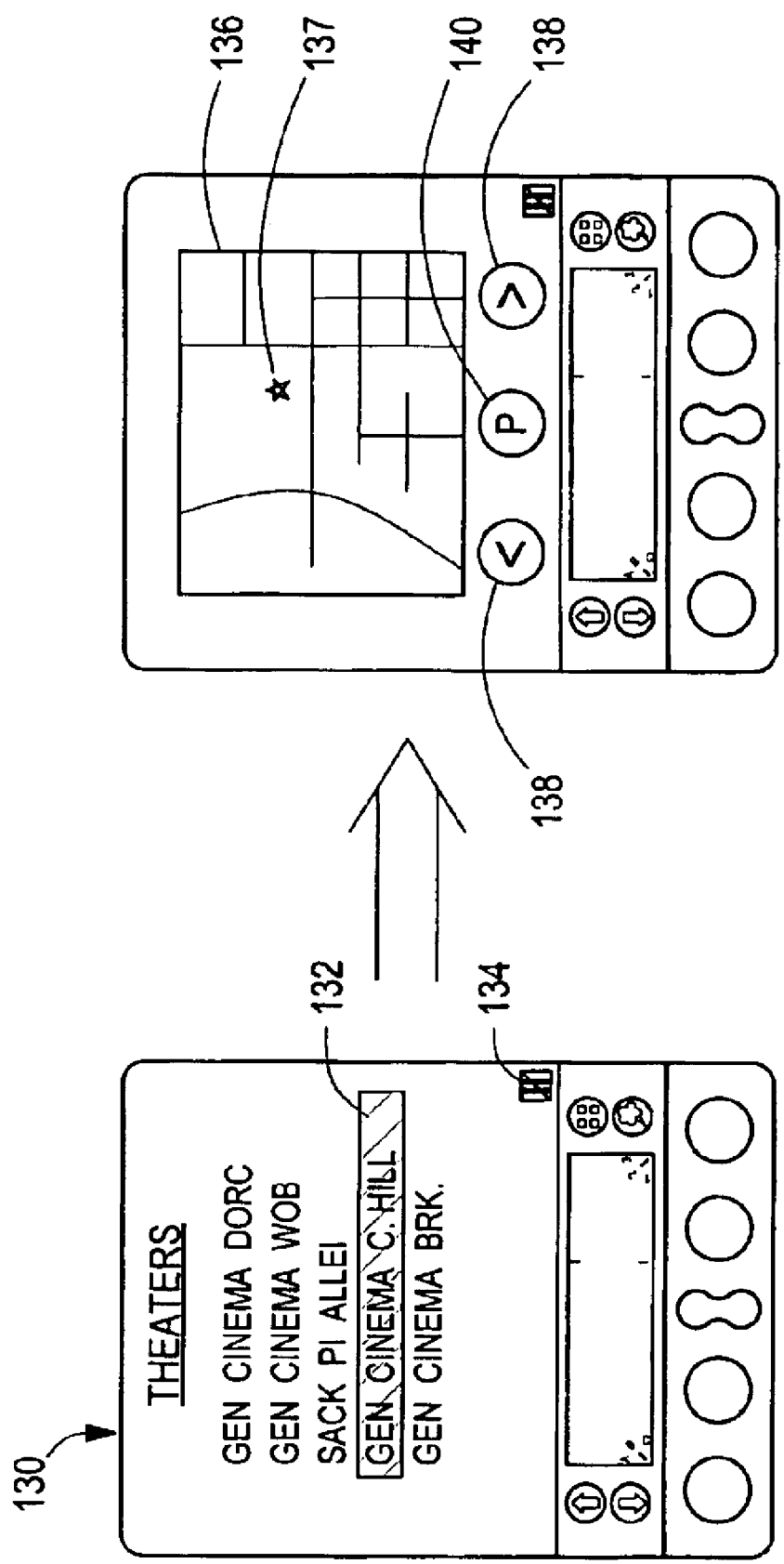
FIG. 4 illustrates the integration of maps with data gathering according to the invention.

Integrating Geographic Information Service and User Location Services to Providing Location-dependent Content The geographical information service (GIS) is a user friendly mapping application that has been designed to accommodate the various handhelds 10 incorporated in the GloDAN. When displaying maps, GIS takes advantage of the data tagging and the EGTSS display technology to provide these maps quickly. Currently, GIS supports zoom buttons incorporated in the display that allow the user up to six levels of mapping detail. Implementation of more levels and click-able icons with personalized services can also be included. Directory applications such as those that list cinemas, hotels, hospitals, libraries, clinics, restaurants, shopping malls, car garages, bus stops, subways, cash machines, gas stations and further services can be integrated with the GIS interface. FIG. 4 illustrates a screen 130 showing a listing of movie theatres where one theatre 132 is highlighted. When the user depresses the map button 134, a map 136 that highlights the actual location 137 of the previously selected theatre replaces the listing screen 30. The user can zoom out from the current map 136 using the zoom button 138 or can pan around the location using the pan button 140.

The smart search engine has links enabling it to use the location identification and the GIS information to integrate personalization services to the user's location. The digital map can be personalized to display personal icons as well as public and commercial icons. For example, during personalization, described below, the user can agree to have his/her data base and browsing habits be used to support personalizations. In this case, the digital map may show icons of his home, his parents' homes, his office, and his wife's office, his children's schools as well as frequently used ATMs, restaurants, shops, parking facilities, bus-stops, etc as they come into the scope of the displayed map. Because the handheld has only limited display area, it is not efficient to show all possible icons. Personalized icons allow the user to find the desired route to the locations of his/her choice more quickly. For example, when the user wants to stop by an ATM on the way to see a movie from the office, the digital map will display the closest ATMs on that route theatre and also display available parking lots and the traffic conditions on route, as more fully described below.

Wireless providers are now implementing location identification using triangulation based on the multiple wireless antennas implemented in a geographical location. This wireless location technology tracks the user as he roams from the starting location (home location register HLR) to a new serving cell (visitor location register VLR). The mobile operator uses such cells to track the user's location. This technique does not require connections to the GPS (global positioning satellite) system and therefore is much more efficient and inexpensive in comparison to the GPS positioning system. Furthermore, the GPS system does not work well in cities with dense buildings such as Hong Kong and New York while the mobile operator triangulation still functions. For example, the GPS does not work inside of a building.

By integrating the location identification information with the GIS information, mapping displays can be centered on the user's location. This feature allows services such as movies to be listed with the closest theatre at the top of the list or a nearby theatre may prompt with a promotion for the empty seats.

WebCam and Display Services

The EGTSS incorporates a WebCam display service. This service re-encodes a video (a frame or a stream of video) input allowing it to be displayed on the handheld screen. The service accesses video located in a database and reformats it by converting the video format to either a Palm-based size or a Personal PC size. The application applies compression techniques, as described below, to speed the reception of the picture.

Figure 5:
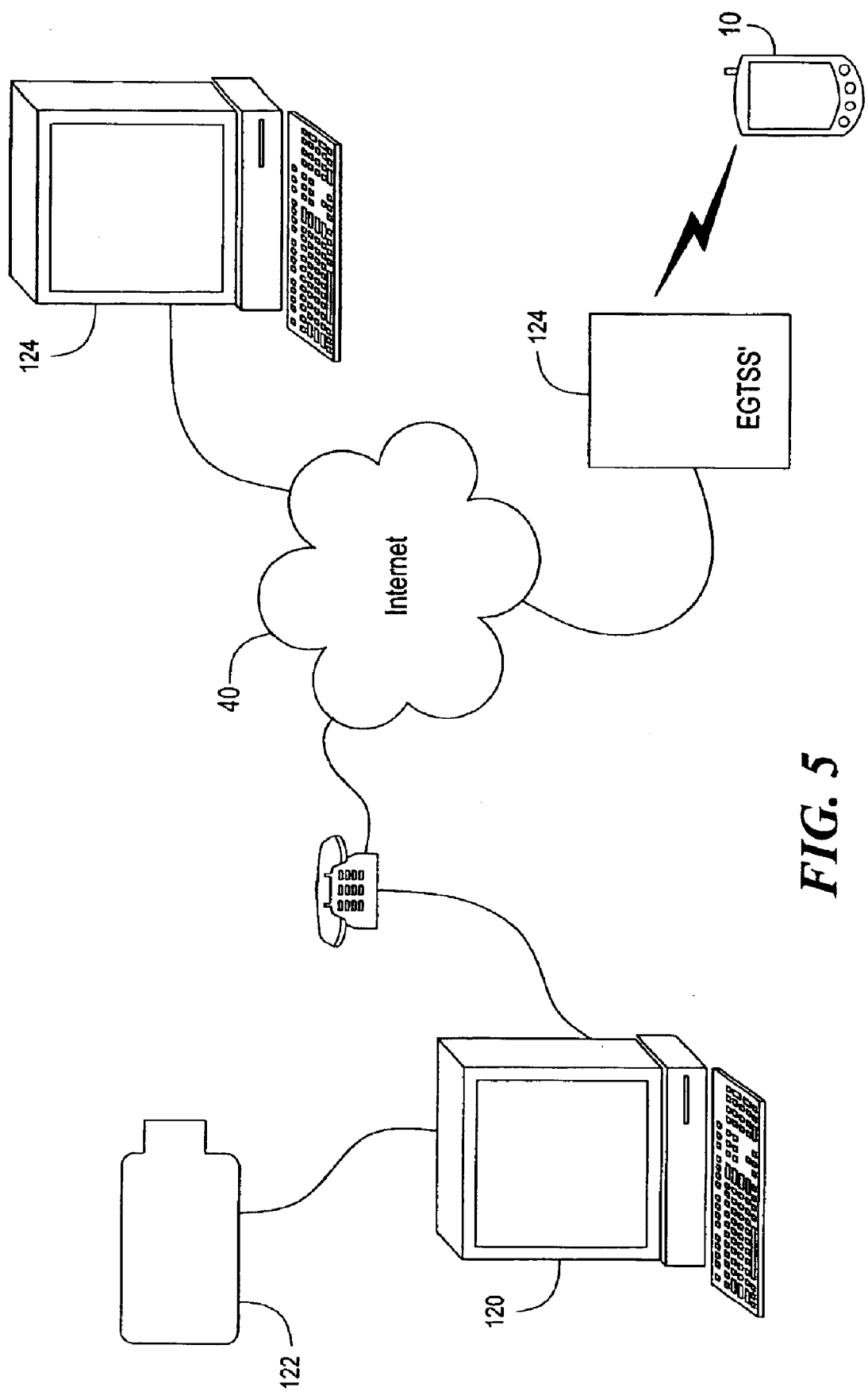
FIG. 5 is a block diagram of viewing WebCam output on a handheld according to the invention.

Coupling this service with PC-Cam applications that store representations of live video in a database, allows a user to monitor remote activity in real-time. Such an application is shown in FIG. 5. Here a home computer 120 is connected to a WebCam 122. Utilities in the home computer 120 format the video for a computer screen and store the video in a database connected to the Internet 40. A remote computer 124 accesses the picture from the Internet, or the EGTSS 124 accesses the picture and reformats it to be presented on the handheld 10.

In Hong Kong, the traffic conditions are monitored by the Government and made available to any user using the system disclosed in prior U.S. patent application Ser. Nos. 09/564,352 and 09/694,643. Using the WebCam display services, such a system is intergratable with the personalized digital map display. In this case, the places where government traffic monitoring cameras are displayed as a click-able traffic camera icon along the user's route on the digital map. The user only needs to click on a traffic monitor icon to connect directly with the specific camera where the local traffic condition is being monitored. Personalization will assure that for a user that specifies subway travel, such traffic icons will not be displayed.

When GloDAN access picture frames and streaming video over the Internet, it uses the directed path capability of the Internet as described below. This allows each packet of the video stream to arrive at a regular interval rather than the irregular arrivals likely without the direct path utility. Because the video arrives in a regular stream, the picture is not choppy and the audio is not broken. The GloDAN streaming video looks as the user expects—smooth with a consistent audio quality.

Acceleration and Compression Techniques

The EGTSS system applies acceleration and compression techniques to the web oriented data that are being sent to the handheld. Most web servers do not provide the data in a compressed form. An acceleration server performs the acceleration and compression needed to translate and compress the data for interaction between the handheld browser that expects compressed screens and the non-EGTSS web server. The acceleration server applies file reformat and compression algorithms in addition to using the GTSS data tagging technique. For example, compression can be based on the frequency of each occurrence of a character or a micro image in a file. By using a simple symbol to denote the character or the micro image, compression of the file size is accomplished. The present invention uses a new compression method based on the gzip format. A client side program, installed on the handheld, reads the header information on a downloaded file (in a highly compressed format) and commands the browser to select the right tool to decompress the file back to the original format.

The acceleration and compression methods can be deployed on the server side only or on both the server and client side (the handheld) as detailed below:

Server side—Image compression, as is known in the industry, limits the volume of information that needs to be transported over the wireless link by removing the unneeded repeated pixels. For example, the acceleration server analyzes graphical data and HTML and reconstructs the files to fit the handheld's screen. Since there are limitations in the viewing area, some HTML tags are deleted so the handheld does not receive commands that cannot be acted upon.

Further compression routines convert GIF/JPEG images that are too large for the handheld screen into PNG format that is better suited to the screen limitations of the handheld. In addition, PNG is a more compact packing format. Since an image with only the resolution needed for the handheld is transmitted in the most compact format, this server side technique provides a significant reduction in download time for most graphical web pages. Server side acceleration without compression is used for any handheld with an existing HTML browser but without the necessary support for decoding, decompression or other acceleration client programs.

Server and client side image compression—is used in the case where the handheld accepts a pre-loaded decoding program in either software or hardware form. This technique is needed in cases where exact file decompression is needed. High speed routines, written in a language such as C, C++ and Java are used at the acceleration server to re-size and re-compress most of the JPEG/GIF and HTML images into a smaller format in order to reduce the download time. The preloaded client program in the handheld decompresses and recovers the original files.

For video images, a JAVA class or MPEQ class compression is set up to further reduce the size and enhance the download time of live traffic videos.

Caches are used to hold the compressed data close to the user. Caches limit the need to wait for an Internet traverse to access the information needed. When a cache is located at another EGTSS server, direct connections between the servers, provide data from the remote server without waiting for the Internet.

Document Caching

Proxy servers are used to increase the speed of data retrieval by caching the data close to the users. As a result, the user connecting to an EGTSS will have much of the data and information needed without going through the Internet to web servers where the actual document is stored. The use of a distributed proxy server system, based on interconnecting the various EGTSSes in the region, further increases the efficiency by sharing the storage and directing the traffic through the most efficient paths. Because each proxy server has a designated IP address, recalling documents from one proxy server to another is done by simply directing a query to the proxy server's IP address. Furthermore, since the distributed proxy system forms its own network, more efficient routing designs and higher level protocols such as the internet cache protocol can be used in place of the slower TCP/IP protocol currently used in the Internet.

Self-creating Databases

Minimal effort is required to extend GloDAN whenever mobile carriers join the service. A local modem pool can be provided and subscribers utilize dial-up to connect to a self-creating database for GloDAN. The EGTSS self-creates a new database in a geographical location automatically once it is given a set of parameters such as those listed in Table 2. In particular, the Self-creating database needs to know the country designations that it will serve, the applications that it will be customized for EGTSS operation and the standard applications that are expected to run in the served handheld 10.

TABLE 2

Self-Creating Database for GTSS

Inputs to the Automatic Self-Creating Database

Primary Location
Secondary Location (s)
Links to other Databases
Level of Security for each link
Personal Database Requirements
Applications List
Email
FAX
WebCam/ Compression factors
ICQ
Virtual Library
Multi-player games
Ecommerce parameters
Entertainment preferences
Shopping preferences
Food
Gambling
Geographical Information System (GIS)

Figure 6:
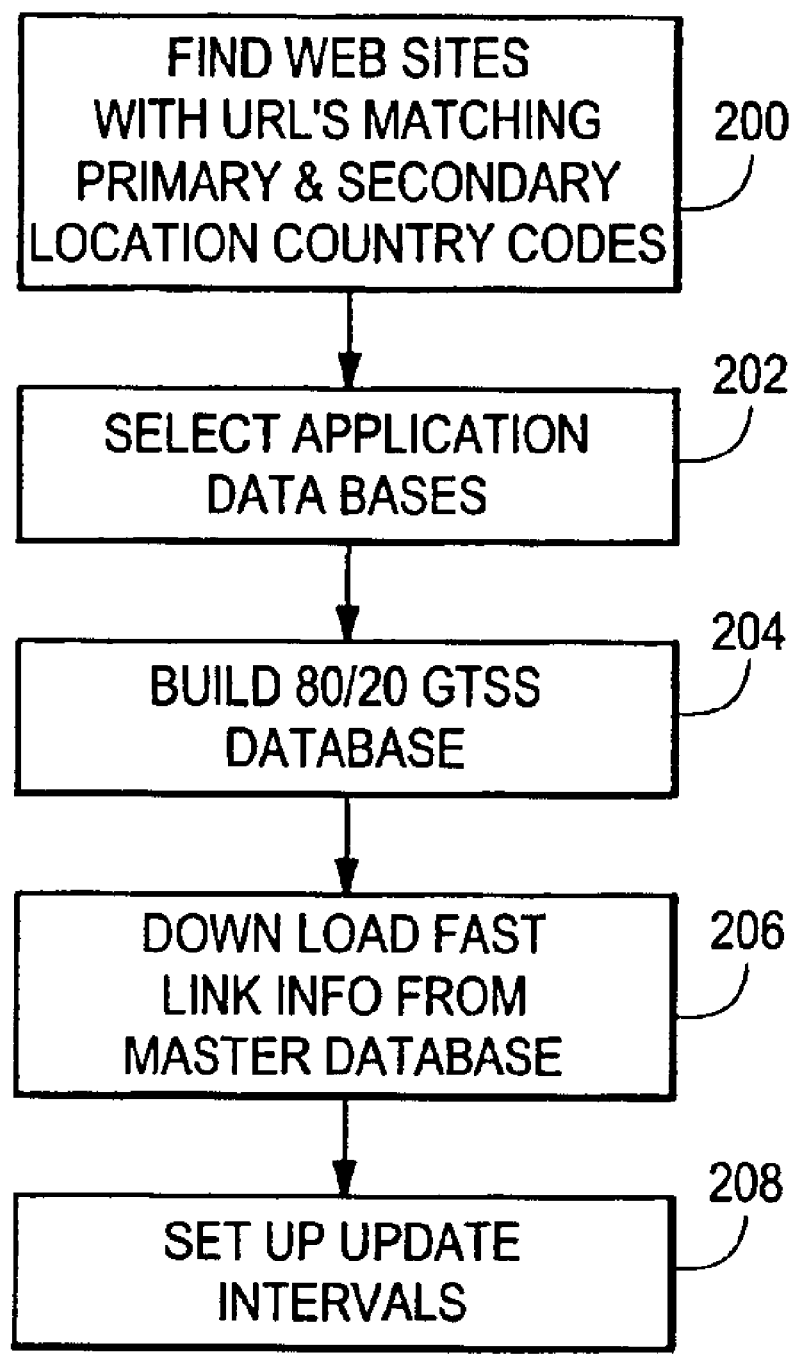
FIG. 6 is a flow chart of the operations of a self-creating local database.

Once this data is provided, the steps illustrated in FIG. 6 are executed. The self-creating database performs searches on the world wide web looking for sites with URL(s) that match the country code of the primary and secondary locations. It stores those URLs for use by the self-creating database, step 200. Next, the self-creating database creates the data bases needed for the applications listed, as in step 202. The 80/20 RIDb for this location is built, step 204, as illustrated in the prior patent applications. Next the Self-creating data base is connecting to a central database and loads the "fast links through the Internet" information from the master data base located there, step 206. The use of the fast links will be further detailed below. Lastly, the self-creating data base sets up the timers and intervals for analyzing usage patterns and updating the data bases now held in the EGTSS server, step 206. This method makes it possible to add new EGTSS servers, when a few users subscribe to the service in new locations. In one implementation, the system is configured in English as that is the preferred language of the Internet 40 and the local application is responsible for the translations as needed.

Data-mining to Find Correlation's for Predictive Services and Predictive Updates to Personal Database The EGTSS uses data-mining to find correlations between the users' actions. Previous applications have detailed the browser habit learning, which was used to further populate the database with data that the user repeatedly accessed. The predictive services extend this analysis to add a time component to the analysis. For each user, the user's web access and data access is tracked and patterns are detailed. Based on this data, the server uses the Internet to update the database just when a user is logging in the EGTSS. When the user does request the data, the turn-around time is significantly accelerated and the user does not have to wait for the request to traverse the Internet. The predictive services analyze both the databases maintained by the server for all users and the databases that the user maintains in personal space. In applying predictive services, the data is analyzed also to determine which parts change and therefore, could be tagged and which parts are static and will not need updating.

Implement Full Security Features Including SSL/HTTP Proto-groups and Processing Security Features in Parallel with Content Access to Accelerate Content Retrieval The EGTSS provides a range of security features beyond the GTSS, which primarily relied on firewalls and VPN's for security. These features improve on those available through WAP and I-mode protocols, which include only primitive level security sockets. The security component of the MSC gateway 116 utilizes the public key infrastructure (PKI) to allow messages between the EGTSS and the handheld 10 to be encrypted and digitally signed. This allows the users access to data that is protected in various levels.

A second level of security is implemented in EGTSS by utilizing a combination of three further types of security. The secured socket layer (SSL) software, known in the industry, establishes a secure communication channel to prevent the interception of critical information such as credit card numbers. The SSL is a base line technology to allow the EGTSS to support secure electronic financial transactions. Further, a secure hypertext transfer protocol (SHTTP) is also supported by the gateway to allow the encryption and authentication methods to be used across the Internet. Further imbedded within the gateway 116 is support for password based authentication of the user's transactions and E-certificate programs that allow end to end encryption between the user and the ultimate destination of the data being sent.

The quick-connect facility is now integrated with error detection and error correction to deliver error free data transmission. This feature is important for mobile commerce and secure applications such as banking. Error detection will initiate re-transmission of certain data packets until the relevant trains of data packets are proved to be error free.

Figure 7:
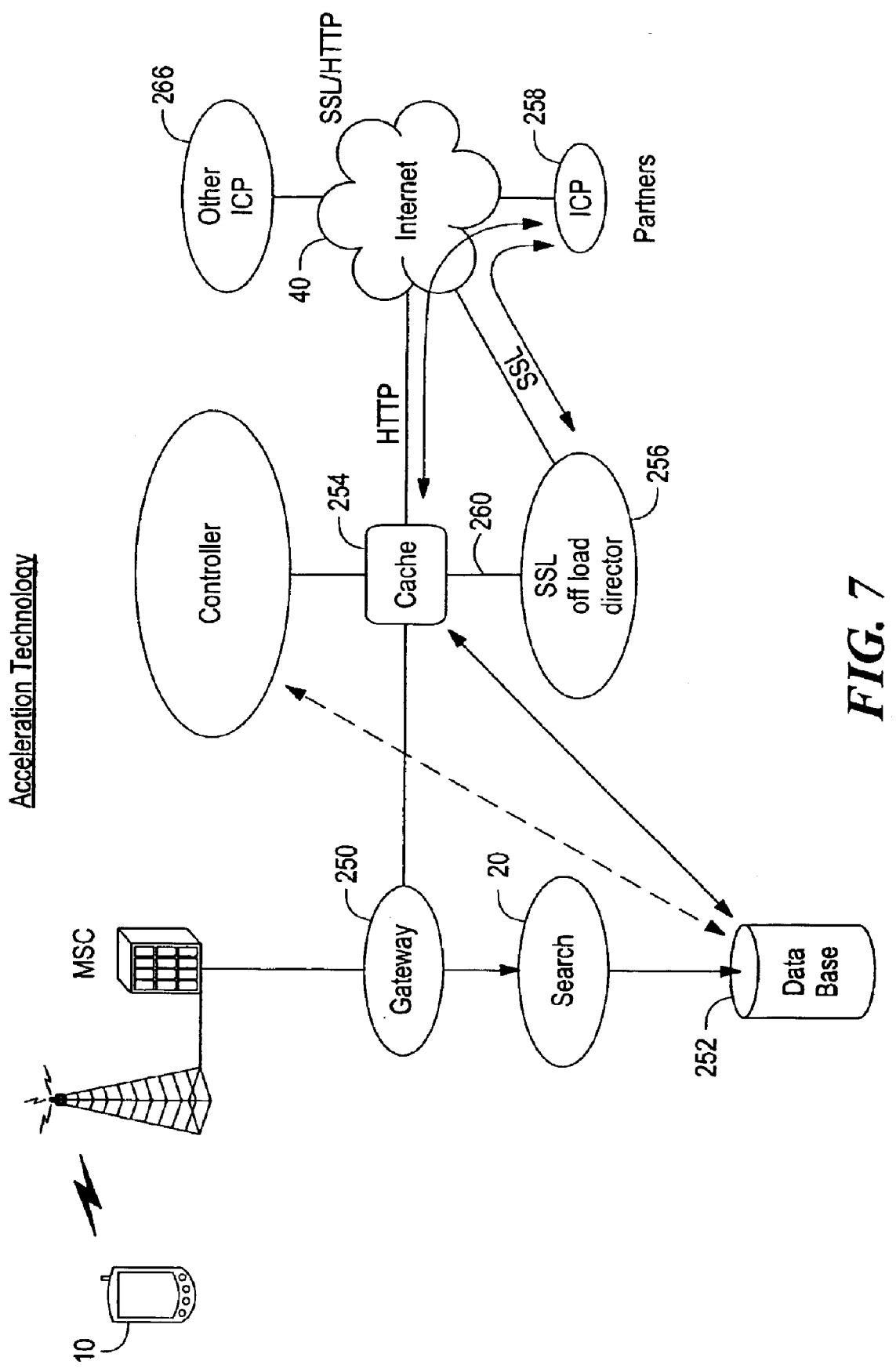
FIG. 7 is a block diagram of the operation of the security features according to the invention.

FIG. 7 illustrates one of the implemented speed mechanisms for handling the security measures. Gateway 250 can receive secure communications from the handheld unit 10. After validating and decoding the message, the search component of the message is sent to the intelligent search device 20. The intelligent search device accesses databases 252 to determine the most efficient way to retrieve the information. In many cases, the information will have been cached in cache 254 previously or in the distributed proxy system (not shown). Before the data is provided from the cache, the SSL offload director 256 utilizes its connection to the information content provider (ICP) partner 258 to validate the user's permission to access the data. Should the data in the cache 254 be outdated, an access through the Internet 40 utilizing the HTTP protocols will be sent to the ICP partner 258. In this case the SSL offload director will decode the SSL information and negotiate the permission with the ICP partner 258 before the information is returned.

If a non-partner ICP 266 has provided the outdated data, then the SSL and HTTP data to be used to retrieve that information is sent to the non-partner together. Since the security measures are executed by the ICP 266, data delivery must wait until security is checked.

Figure 8A:
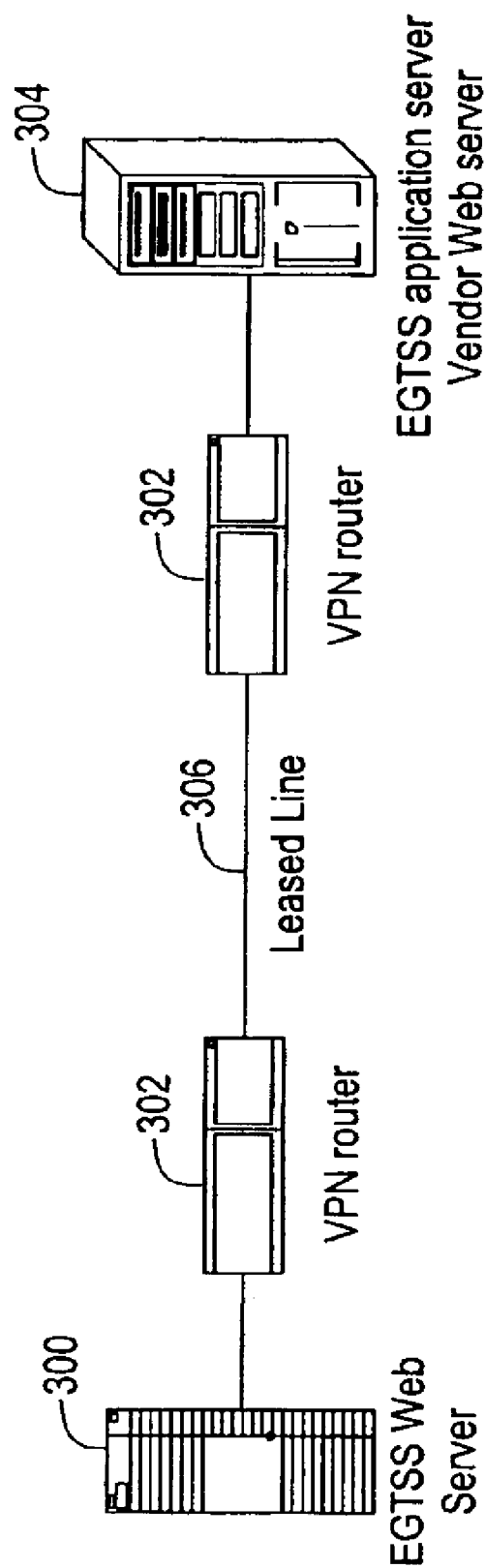
FIG. 8a is a block diagram of a Virtual Private Network according to the invention.

A more secure communications option is a secure virtual private net (SVPN). The configuration of a SVPN is illustrated in FIG. 8*a*. One part of the EGTSS functions as a secure web server 300 implementing the HTTP and SSL communications illustrated in FIG. 6. The protocol does not traverse the Internet but instead traverses a leased line 306 between the EGTSS web server 300 and the vendor's web server 304. Installed in the vendor's web server 304 is a EGTSS applications server handling the security functions while also performing EGTSS functions locally that speed up the communication and limit the need to translate the messages once they are received by the web server 304. A hardware VPN router 302, as is known in the industry, is interposed between the leased line 306 and the servers 300 and 304, making the leased line 306 look like a direct circuit switch connection.

Figure 8B:
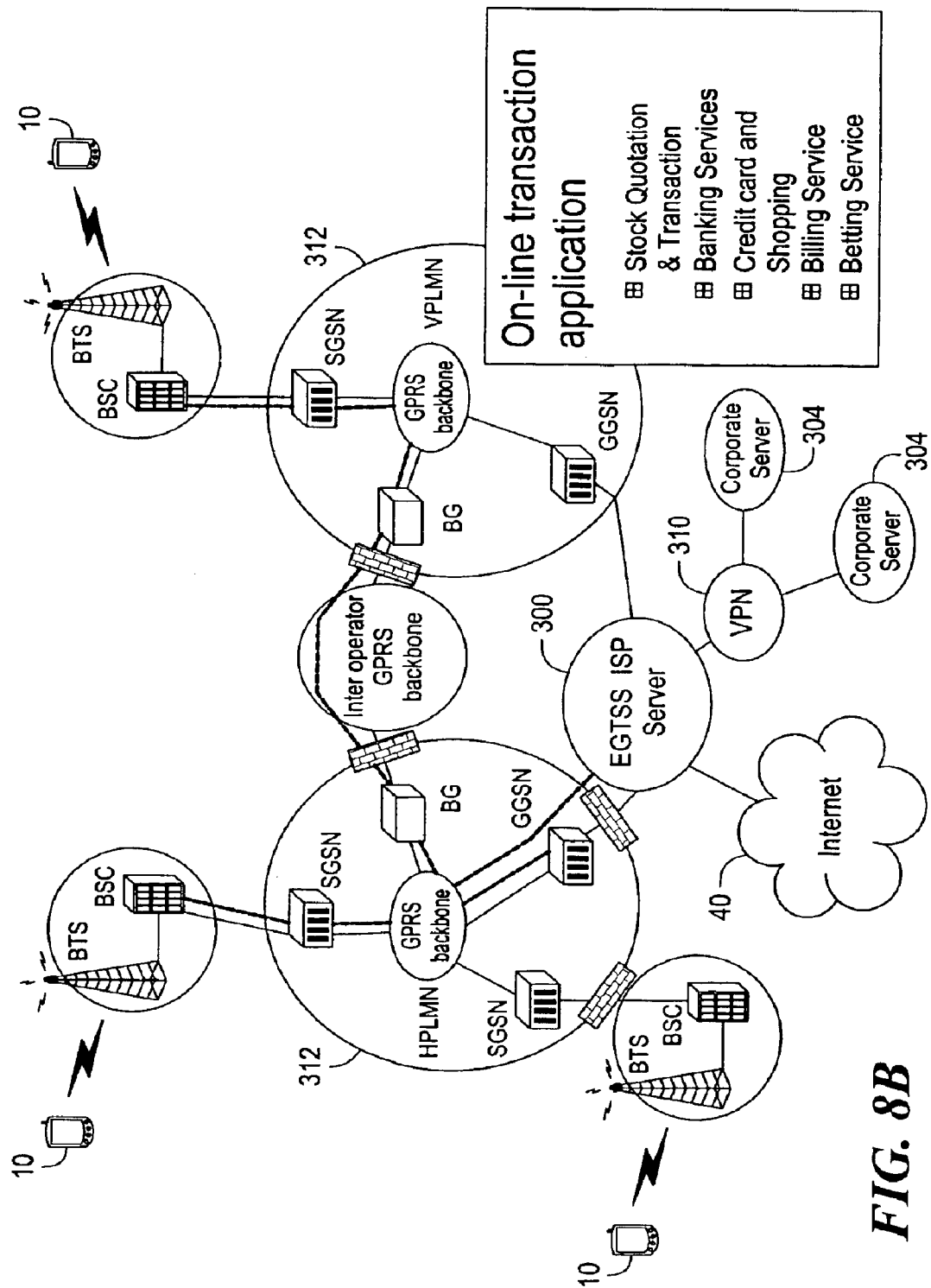
FIG. 8b is a block diagram of the VPN of FIG. 7 integrated in a the network according to the invention.

An illustration of how a SVPN is utilized in an overall system is shown in FIG. 8*b*. Here, two GPRS distribution networks 312 are shown connected to an EGTSS server 300. A VPN 310, terminated at two corporate servers 304, is appended to the EGTSS server 300. The SVPN 310 can handle on-line transactions such as a stock quotation and transaction service, a banking service, a credit card and shopping service, a billing service or a betting service. For these services, the information sent to finalize the service transactions is sensitive and must be protect from theft.

Ecommerce

When the client digital certificate capability is enabled in a handheld device 10 of FIG. 8*b*, the handheld 10 can provide User Authentications, Digital Signature, Data Encryptions, Electronic Certification and Tamper Detection. These applications of client certificate capability lead to reliable capabilities for E-Commerce applications. The security can be improved further by implementing an error detection and correction mechanism such as code combining to ensure error-free transaction within the wireless connection.

E-Commerce applications are linked to the user search application. When a search is conducted on a service providing entity, GloDAN monitors for a final selection (one that has no further searches needed) and automatically offers the opportunity to purchase the final selection, such as a movie or an airline ticket.

Acceleration Server

The acceleration server encompasses acceleration and compression as outlined in the section Acceleration and Compression Techniques. In addition, it also integrates caching, HTML reconstruction, content application optimization and predictive behavior analysis. It is primarily a comprehensive set of services in the server that responds to the handheld for all information, data, applications and Internet accesses. When the handheld makes a request for content, the proxy server utilizes the acceleration server to intelligently accelerate and reformat the requested data for that handheld's optimum viewing and delivery. The result of the acceleration server's actions is reduced traffic congestion on the mobile operator's network because data compression and caching techniques are used.

The acceleration server is a modular program that is easily installed on partner systems to place the accelerating benefits of the data manipulations as close to the data source as possible. Therefore, the transmission from the data source consists of compressed data even as it traverses the high-speed Internet connections.

Figure 9A:
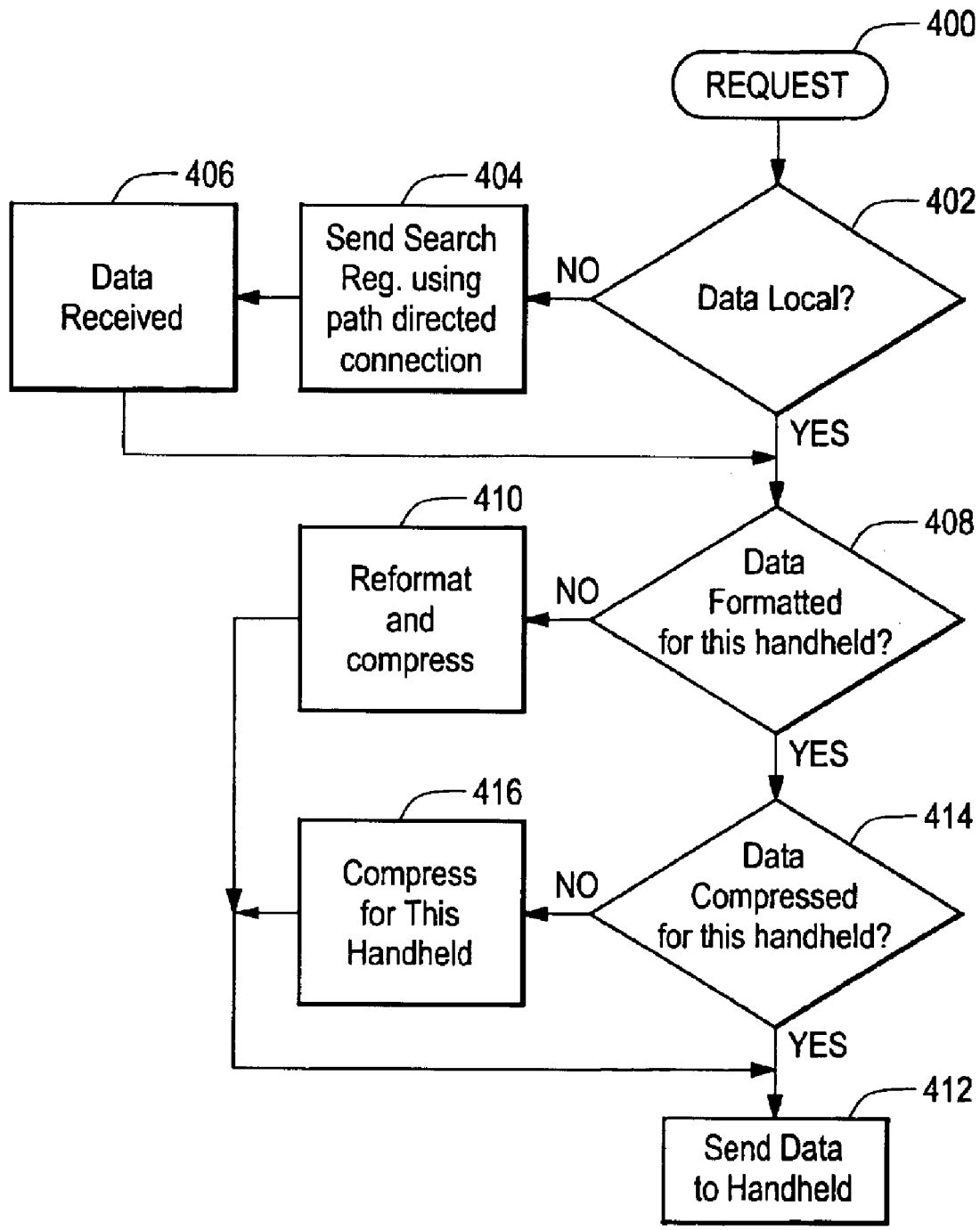
FIG. 9a is a flow chart of the operation of an acceleration server according to the invention.

The flow charts of FIG. 9 illustrate the logic of the acceleration server. In FIG. 9A, the server's acceleration server is shown. A request from the handheld 10 is received by the proxy server, step 400, and passed on to the acceleration server. The acceleration server queries the mapping server, step 402, to find the best source for the data. If the data is on the Internet, the acceleration server passes the request on to the directed connection services, step 404, for retrieval. When the data is retrieved, step 406, it is passed to step 408 for further processing. If the data is cached locally, step 408 is executed.

In step 408, the data is tested to determine whether it is formatted for the type of handheld issuing the request. If the data is not correctly formatted, step 410, it is reformatted for the handheld 10 and compressed to fully utilize the capabilities in the requesting handheld 10. If the data was correctly formatted, the acceleration server checks that the data is compressed using the techniques supported by the handheld, step 414. If necessary the acceleration server compresses the data in step 416. Ultimately, the data is sent to the requesting handheld 14, step 412.

Figure 9B:
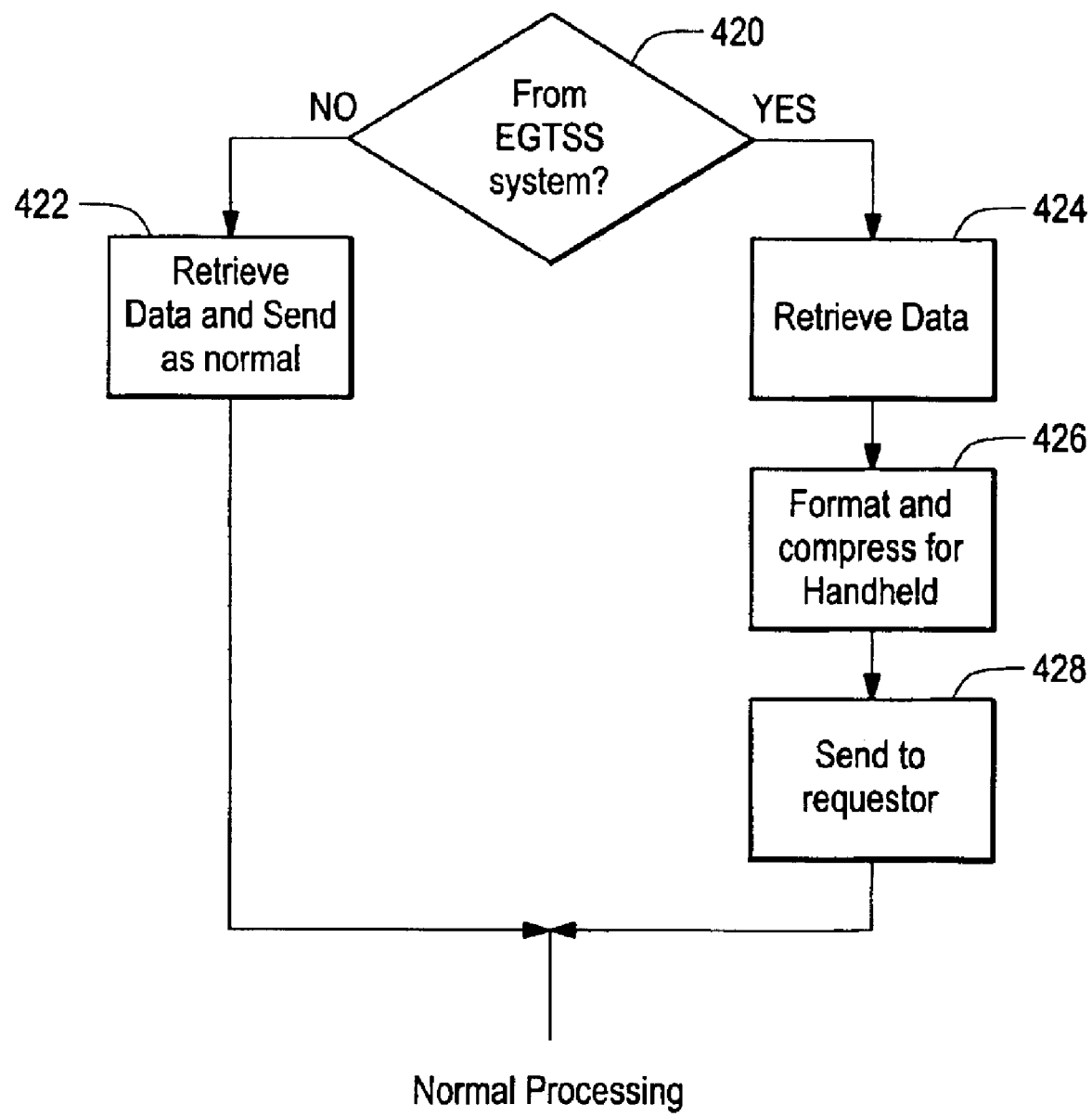
FIG. 9b is a flow chart of an acceleration module to be integrated at a web server according to the invention.

FIG. 9B illustrates the modular component that may be linked in a data source. Each time data requests are received at an Internet source, the routine checks whether the request originated at an EGTSS system, step 420. If the request was not from an EGTSS system normal operations proceed, step 422. If the request was from an EGTSS system, the routine retrieves the data, step 424. The data is them formatted and compressed for the particular handheld device, step 426, and is then sent to the requesting device, step 428.

Personalization

GloDAN consists of the network where all EGTSSs are connected together. A user that is roaming through various regions logins into the local data service through various gateways that are part of the EGTSS of that particular area. The GATEWAY contains a local user database as well as having the ability to retrieve user profiles from other regions. As such, GloDan can continue to use the profile to best serve the user and analyze each user's Web surfing pattern to enable it to predict the Web surfing pattern in the future whenever the user is located presently. This allows GloDAN to have fresh data in the local cache waiting for the user rather than have the user waiting for the data. In addition, the predictive behavior analysis analyzes the sequences of users' requests. Knowing which request triggers a string of follow-on requests allows the server to limit periodic updates to only the trigger requests. The follow-on requests are updated as soon as the trigger request is accessed thereby saving updates while providing a prompt response.

Each user is provided with a storage area for e-mail, chat histories, and file storage. At least attachments for Pocket Word, Pocket Excel and JPEG are supported. GloDAN records the type of handheld, the compression algorithms being used, and the encryption being utilized by each user. This data allows the acceleration server to accommodate the differences in configurations.

The EGTSS includes an authentication function and brings up the personal profile of a user subscribed to the personalization services. The personal profile also allows the speedy search to perform a smart search taking into account the user profile.

The personalization services allow users to chose their desired services from a list of service providers. The subscriber can tailor a profile to customize the services selected. When the subscriber selects a category at the handheld 10, only the selected providers will be displayed. If an entire category is unselected, it will not be presented as on option. For instance, a subscriber may select a personal bank. Thereafter, that bank's ATM's, branches and services will be displayed whenever a banking service is requested.

Associating an Internet Address with Each Handheld

The system uses the Internet 40 as a backbone interconnect system. By assigning an Internet Address to each handheld 10, the handhelds are granted full privileges on the Internet 40. While the servers will try to present data from a cache, the Internet is used in the cases where the data is not available anywhere else.

Interpret Compressed Transmissions

Each of the compression techniques detailed previously allows the data to traverse the wireless network more quickly. However, the programs that interpret each technique exact a cost in terms of memory space and execution time. As part of the personalization, each handheld 10 is set up with a subset of the compression techniques. The acceleration server assures that data is compressed appropriately for the handheld. Further, the proxy server interprets incoming transmissions using the compression techniques required by the sending handheld 10.

Full Use of Security Provisions

In the handheld, the security structures allow the mobile user to use digital signatures and encrypt data via the user's personal private key in cooperation with the receiver's use of the designated public key. Therefore the mobile user can have the full capability of conducting business on the Internet from the wireless handheld. The security provisions in the handheld 10 may be limited in functionality and in applicable applications to reduce the effect on the performance and memory usage.

GloDAN subscribers enjoy global mobile Internet access because the system handles user authentication across multiple networks. The subscriber is enrolled with a user name that is associated with a personal domain identifier. When the subscriber accesses the GloDAN services from outside the personal domain, GloDAN uses the local gateway for a first level authentication and them routes the access requests to the user's personal domain for final verification and detailed permissioning.

Ecommerce from Handheld

In E-Commerce, security is very important. However, because the server utilizes parallel handling of the security measures, the content delivery is not a serial process with the security verification.

Full Use of Personal PC Applications

One implementation of the handheld 10 uses Microsoft Windows CE as the operating system. This operating system allows the handheld 10 to interpret HTML, JAVA, and XML, the common formatting medium of Internet content. In addition, this operating system has been adapted to allow reading Email, including attachments, to use file sharing protocols and to use applications such as Word and Excel.

For the Palm Operating System, the standard applications supported are mail and display services. When using a personal PC, standard Email can be used. Currently WAP, I-mode and Palm OS require a non-standard Email that does not fully implement reading Email attachments.

Independent of operating system, the handheld conducts searches on the Internet using the Speedy Search application previously described.

Central Database Tracker so any Location Can Find the Optimal Available Source of Needed Content A central database is implemented for GloDAN. The central database facilitates connecting EGTSS systems serving different areas through a Virtual Intranet. FIG. 10 illustrates the use of the central database 446. Three regional EGTSS systems 440 are illustrated for Singapore, Hong Kong, and Taiwan. Each is connected, through its proxy server 442, 444, and 446 to the Internet 40. The mapping servers 29 and the central database 452 are synchronized. The central database 452 tracks what data is stored in each EGTSS system and records how to access that data. When a request for previously unknown data is presented to the mapping server 29, central database 452 over path 456. If the central database 452 has a record of the data being stored in another EGTSS system, it provides the details on how to access the data over path 454. Otherwise it suggests a normal Internet data access.

When the mapping server 29 saves new data in one of its databases, it informs the central database 454 over path 456. The central database records the change in the centralized database 448, but does not regard that data as sharable among EGTSS systems until further processing has moved the data into the systemized central database 450. The processing the move the pointers to the new data to the systemized central database includes computing the best path to the data from each of the other EGTSS servers throughout GloDAN.

Use Knowledge of Internet to Direct Information on a Known Path Rather than have Variable Delay Time Through the Internet The central database maintains a directory of fast paths to expected data access sites. These fast paths may be direct connections, but in many cases are specified routes through the Internet rather than the route that might be found if the communication participated in the standard Internet routing. When a cache containing the needed data is located at another EGTSS server these direct connections between the servers provide data from the remote server without waiting for the Internet. By using traffic directional mechanisms such as directing the data traffic from one known EGTSS server locations to the others, such data routing can bypass much of the Internet traffic jam. For added security, a Virtual Private Network (VPN) can also be formed with software encryption or secure virtual private network (SVPN) with hardware switches.

By directing communications outside of the EGTSS network through specific paths in the Internet, the access is speeded. In essence the Internet backbone is converted into an Intranet for GloDAN. The handheld 10 formats requests as standard Internet requests, but GloDAN intercepts the requests to provide a more responsive service. The access looks like a simple Internet transaction despite GloDAN's manipulation of the request.

Figure 11:
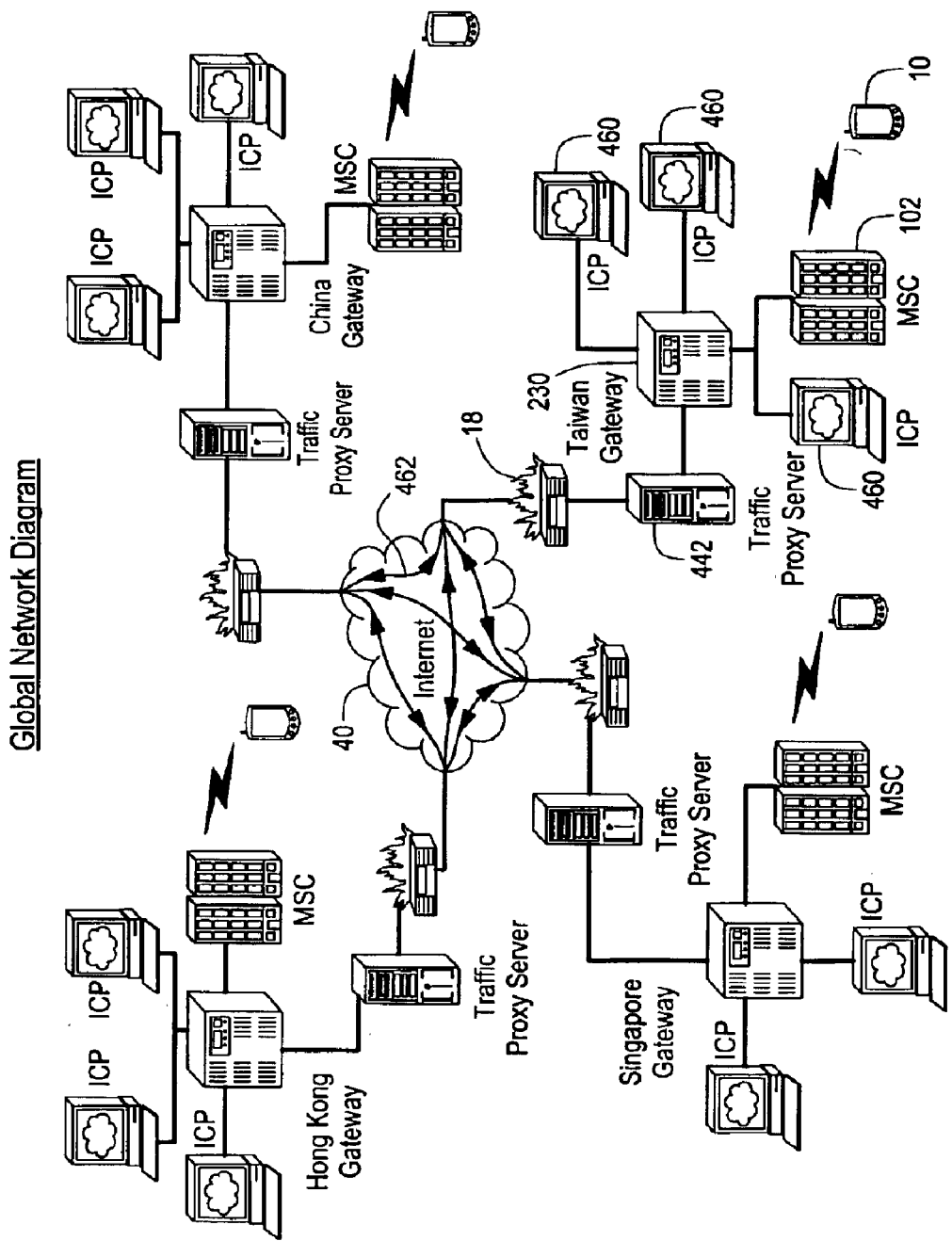
FIG. 11 is a block diagram of a global network showing directed paths according to the invention.

FIG. 11 illustrates the directed routes while omitting other features such as the central database. Four Systems are illustrated for China, Hong Kong, Singapore and Taiwan 230. Each system has direct connections to the wireless network 102, and the ICP partners 460. All other connects pass through the Internet. The proxy server 442 through firewall 18 conducts each repeated system access of the Internet 40. These Internet accesses from the proxy server 442 are tagged with the required path 462 through the Internet 40. The central database 454 has determined the fastest path between the two points and stored it in conjunction with the data pointers.

Caching Frequently Requested Data in Multiple Databases for Speed—Incorporating Coordination of Data (Dynamic Database Support)

The central database determines where data should be cached. High utilization databases will be stored local to an EGTSS server, while infrequently accessed data will not be cached at all. The central database includes the routes to popular databases and regional URLs. The central database utilizes its knowledge of the fast paths through the Internet when determining how many copies of data will be maintained in the system.

There is a caching hierarchy. The caching hierarchy is supported with the distributed proxy server system outlined previously. Cache contents are not duplicated if a high-speed link to the needed data is available. The Central database tracks the data/cache relationship and tracks the high-speed links (Dedicated VPNs or high-speed directed paths through the Internet) between nodes of the GloDAN network. For nodes that are not connected by high-speed links, the needed data is replicated based on a frequency of access. For those nodes that have a high-speed link, the data is stored in only one of the nodes and other nodes access it via the high-speed links. In addition, the central database may direct a cache that has just been updated to broadcast its data to a set of nodes determined by the central database. In this way, all caches holding a particular set of information are updated in the most expeditious manner.

Having described preferred embodiments of the invention it will now become apparent to those of ordinary skill in the art that other embodiments incorporating these concepts may be used. Accordingly, it is submitted that the invention should not be limited by the described embodiments but rather should only be limited by the spirit and scope of the appended claims.

What is claimed is:

1. A mobile wireless data network to function in conjunction with a wireless network, the Internet and a multi-media handheld wireless device connected to said wireless network, said mobile wireless data network comprising:

a gateway server having a direct connection to a mobile switching center of said wireless network;

a local database, co-located with said gateway server, populated with frequently requested data formatted for presentation on said multi-media handheld wireless device, said local database connected to said gateway server;

an application for conducting an Internet search for data not held in said local database and reformatting data retrieved by said search for said multi-media handheld device, said application for conducting an Internet search connected to said gateway server; and a mapping application to select the source of requested data based on the fastest response time, said mapping application connected to said gateway server.

2. The mobile wireless data network of claim 1 further comprising:

a plurality of wireless networks utilizing a transmission protocol selected from the set of GSM, GPRS, CDMA, TDMA and CDPC;

a plurality of gateway servers, each gateway server connected to at least one wireless network using only one of said transmission protocols; and each of said plurality of gateway servers being associated with at least one of said local database, said application for conducting an Internet search and said mapping application.

3. The mobile wireless data network of claim 2 further comprising;

a central database tracker application accessible by each of said mapping applications to provide a data location access path and access time for each local database.

4. The mobile wireless data network of claim 3 wherein a user of a first multi-media wireless handheld operating on a first wireless network using a first transmission protocol access data from a local database connected to a gateway server connected to a second wireless network utilizing a second transmission protocol.

* * * * *